INVENTOR
GEORGES HENRY
BY
Corey, Hart & Stemple

United States Patent Office 3,169,015
Patented Feb. 9, 1965

3,169,015
PROCESS AND APPARATUS FOR THE RECOVERY OF HEAT FROM FURNACES FOR WORKING GLASS AND SIMILAR PRODUCTS
Georges Henry, Jumet, Belgium, assignor to S. A. Glaverbel, Brussels, Belgium, a Belgian company
Filed Jan. 29, 1962, Ser. No. 169,448
Claims priority, application Belgium, Feb. 17, 1961, 477,663
7 Claims. (Cl. 263—29)

The present invention relates to a process and an apparatus for recovering heat from furnaces for working glass and like products, and it concerns more particularly furnaces in which the vitrifiable composition is heated while descending in counter-current to a flow of hot fumes emanating from the melting zone of the furnace.

Furnaces of this type generally take the form of a vertical cylindrical column, within which the vitrifiable composition falls in scattered form from the top to the bottom, at which is situated the bath of molten glass into which burning gases are injected. In the course of its fall through the column, the composition passes in countercurrent to the fumes emanating from the melting, in contact with which it becomes heated.

Some of the heat of the fumes is therefore utilised for heating the composition, but another part of this heat is lost, on the one hand through the walls which it heats and which radiate towards the outside, and on the other hand, as sensible heat of the fumes leaving the furnace at a still relatively high temperature. In addition, the wall of the column is exposed to the radiation of the molten product, which tends further to increase the heat losses.

The invention has for its object to reduce considerably these heat losses. For this purpose, a cooling fluid is circulated in metallic elements disposed against the wall of the exchanger column.

These metallic elements, which are applied to the hottest points of the column, reduce the temperature of the walls and lessen the wear on the refractory materials brought to high temperature and exposed to the corrosive action of the materials and of the gases contained in the column.

Advantageously, there is circulated as cooling fluid in the metallic elements a fluid which feeds the burners of the furnace, preferably the combustion-assisting air. Thus, the heat extracted along the walls of the exchanger column is re-introduced into the furnace.

A furnace according to the invention comprises on the refractory wall of the exchanger column metallic elements through which a cooling liquid can be passed. These metallic elements may be casings disposed against the outer face of the wall, or tubes disposed on the inner face of the wall. The metallic casings are advantageously disposed in the hottest part of the column and the tubes preferably in the least hot part.

The metallic casings are intimately applied against the outer surface of the column. For this purpose, the wall of the refractory blocks against which the metallic casings are applied is carefully trued so as to ensure intimate contact between the wall and the cooling elements. The elements are advantageously contiguously disposed so as to constitute a more or less continuous belt or sheet. By these means, the walls of the column are maintained at a fairly moderate temperature and the heat which would be dissipated into the atmosphere in the absence of these devices is simultaneously recovered.

Each metallic element is joined to a duct for the supply of fresh fluid and to a duct collecting the heated fluid. The cooling fluid may be, for example, water or a fluid with which the burners are fed, such as the combustion-assisting air. In this case, the collecting conduit is advantageously joined to the burners situated at the bottom of the furnace.

A constructional form of the device according to the invention is illustrated by way of example in the accompanying drawings.

FIGURES 2 and 3 are horizontal sections along the lines II—II and III—III of FIGURE 1.

Figure 1:
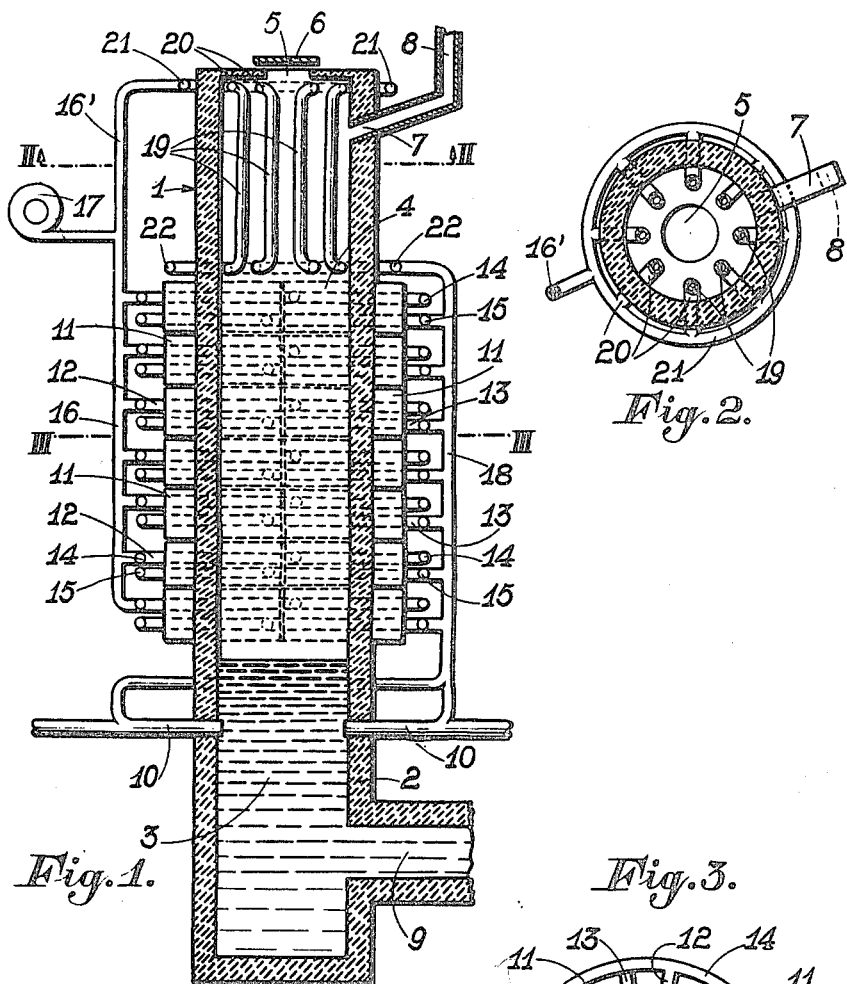
FIGURE 1 is a vertical section through a furnace according to the invention.

The furnace is composed of an envelope 1 of refractory material forming the crucible 2 at the base, which is intended to receive the molten glass 3, and, above the latter, the exchanger column 4. Opening at the top of the latter is the orifice 5 for the charging of the furnace, which orifice is closed by a flap 6. Slightly below the orifice 5, there opens the orifice 7, through which the fumes emanating from the furnace are discharged through the chimney 8. The starting materials forming the vitrifiable composition are introduced into the furnace through the charging orifice 5, fall in scattered form through the column 4 and collect in the crucible 2 to form a mass of molten glass 3, which is discharged through the connection 9.

Combustion gases are injected by burners 10 into the glass mass, which they heat. The gases thereafter rise through the column 4 and thus heat the grains of composition falling therein, and the gases finally escape through the orifice 7 to the chimney 8.

In accordance with the invention, as illustrated in FIGURES 1 and 3, there is externally disposed around the exchanger column 4 a jacket formed of superposed rings composed of hollow contiguous metallic elements 11, of which the face in contact with the fall of the column 4 is adapted to the form of the latter.

Figure 4:
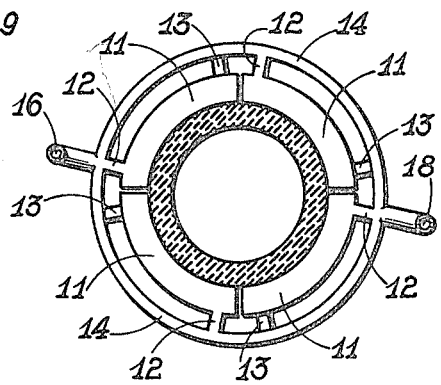
FIGURE 4 illustrates a metallic cooling casting.

FIGURE 4 shows by way of example an element 11, which comprises an inlet duct 12 and an outlet duct 13.

Each element ring 11 is surrounded by two circular pipes 14 and 15 to which are joined the ducts 12 and 13 respectively. The pipes 14 are connected to a main pipe 16 supplying fresh air from the fan 17, while the pipes 15 are joined to a header 18 conducting the heated air to the burners 10.

In the example illustrated in the drawings, for the sake of the clarity of the latter, an element 11 covers a quarter of the circumference of the column, but a larger number of shorter elements may also be disposed around the column in order to produce a uniform distribution of the effect of the said elements over the column 4. This arrangement also makes it possible to effect a better contact between the refractory wall and the metallic elements. In addition, it is advantageous to true the outer face of the refractory blocks of the column 4 in order to ensure a more intimate contact and thus a better heat exchange, of which the cooling action on the refractory wall can only improve the resistance of the latter. In accordance with the embodiment illustrated in the drawings, the column 4 is composed of refractory blocks having the same thickness as those employed for the crucible 2, but owing to the cooling action of the elements 11, it is possible to reduce the thickness of the wall, the result of which will be that the effect of the recovery of the heat contained in the burnt gases will be increased.

When the gases emanating from the combustion reach the upper part of the column, they are still at a relatively high temperature. It is therefore advantageous to extract rapidly and to the maximum extent at this point the heat which they contain before they are discharged through the chimney 8.

For this purpose, as illustrated in FIGURES 1 and 2, a cluster of vertical tubes 19 is disposed against the inner wall of the column 4 at its upper part. These tubes 19, of which the ends 20 are bent at a right angle and extend through the wall of the column 4, are joined on the one hand to the circular pipe 21 and on the other hand to the circular pipe 22, both of which extend around the column.

The pipe 21 is connected to the main pipe 16' supplying air from the fan 17 and the pipe 22 is joined to the header 18 carrying the heated air to the burners 10.

Of course, the invention is not limited to the embodiment which has been described and illustrated by way of example, and modifications may be made therein without departing from its scope.

I claim:

1. In a shaft furnace provided with a melting chamber at the lower end of the shaft and heating means for forming a bath of molten materials in such melting chamber, said furnace being provided with openings at the upper end of such shaft through which raw materials are fed into said shaft and fumes are removed from the shaft, the raw materials being preheated as they fall freely down through the shaft to the melting chamber by the fumes which rise from the bath of molten materials in the melting chamber and pass up through the shaft in countercurrent relation to the freely falling raw materials, said shaft being formed by a tubular wall composed throughout its extent of refractory material, a heat recovery jacket on said tubular wall and extending continuously thereon throughout the height of said tubular wall from a first level situated slightly above the plane of the level of the bath of molten material at the lower end of the shaft, up to a second level at which the fumes are removed from the shaft through one of said openings, said jacket having a lower portion wholly enclosing said tubular wall upwardly from said first level to a level short of said second level, and having an upper portion covering the interior of said tubular wall upwardly from the upper end of said lower jacket portion to said second level, said lower jacket portion being composed of a plurality of hollow members constituted of good heat conducting metal material mounted on said tubular wall with the interior faces of such hollow members in direct surface contact with the exterior face of said tubular wall so that the metal material of such hollow members is in intimate heat exchange relation with the refractory material of said wall, said hollow members being arranged on said tubular wall to provide a vertical series of separate horizontally disposed fluid passageways covering the major portion of the height of said tubular refractory wall above the level of said bath, a fluid supply means connected to and feeding cooling fluid to each of said separate horizontally disposed fluid passageways, and a fluid collecting means connected to and withdrawing fluid from each of said separate horizontally disposed fluid passageways, said upper jacket portion being composed of a cluster of vertical tubes arranged in tubular fashion against the interior face of said tubular wall, the upper ends of the passageways in said cluster of tubes being in communication with said fluid supply means and the lower ends of the passageways in said cluster of tubes being in communication with the upper end of said lower jacket portion, and means spaced exteriorly of said tubular wall for supplying cooling fluid to said fluid supply means.

2. A furnace such as defined in claim 1, in which the lower end of the shaft is provided with a pair of burners disposed in opposed relation below the level of the bath of molten material, and said fluid collecting means is connected to both of said burners, and in which said cooling fluid supplying means supplies a combustion fluid to said fluid supply means.

3. In a shaft furnace such as defined in claim 1, in which each of said hollow members has closed ends to provide a fluid passageway closed at its ends and having an inlet opening and an outlet opening between such closed ends, a plurality of said hollow members being placed end to end about said tubular wall to form a ring-shaped horizontally disposed heat exchange unit, and said heat exchange units being arranged in vertical stacked relation on said tubular wall, said fluid supply and fluid collecting means being connected to the passageway of each hollow member.

4. A furnace such as defined in claim 3, in which said fluid supply and collecting means each comprise a plurality of endless pipes encircling the ring-shaped heat exchange units in said stacked series thereof, means connecting an endless supply pipe and an endless collecting pipe encircling each of said units to each of the hollow members forming such unit, and means connecting said supply endless pipes in parallel and said collecting endless pipes in parallel.

5. The process of recovering heat from a shaft furnace formed of a tubular wall composed throughout its extent of refractory material and provided at its lower end with a melting chamber and at its upper end with openings through which raw materials are fed into the shaft and fumes are removed from the shaft, the raw materials being preheated as they fall freely down through the shaft to the melting chamber by the fumes which rise from the bath of molten materials in the melting chamber and pass up through the shaft in countercurrent relation to the freely falling raw materials, comprising circulating cooling fluid over the entire area of said tubular wall between a first level situated slightly above the plane of the level of the bath of molten material at the lower end of the shaft, and a second level at which the fumes are removed from the shaft through one of said openings, the cooling fluid being circulated in separate streams over the exterior surface of said tubular wall throughout the entire area of the major portion of the height of the tubular refractory wall above the level of the bath and extending between said first level and a third level short of said second level and so that such streams of cooling fluid are in intimate heat exchange relation with the refractory material in such exterior surface area of said wall, and the cooling fluid being circulated in separate streams over the interior surface of the refractory material of said tubular wall throughout the entire area of such interior surface thereof between said third and second levels, the cooling fluid heated on the interior of said tubular wall being joined with the cooling fluid circulating on the exterior of said tubular wall at the upper end of said exterior surface area of said wall.

6. The process defined in claim 5 in which the separate streams of cooling fluid passing over said interior surface area flow vertically downwardly over such area and are collected together at the upper end of said exterior surface area, and the separate streams of cooling fluid passing over said exterior surface flow horizontally over such area and are progressively collected downwardly through such area.

7. The process defined in claim 6, in which the combined streams of cooling fluid from said interior and exterior surface areas of said tubular wall are delivered from the lower end of said exterior surface area to the furnace burners for use in melting the vitrifiable composition in the furnace.

References Cited by the Examiner

UNITED STATES PATENTS

| | | | |
|---|---|---|---|
| 975,998 | 11/10 | Resinelli | 266—14 |
| 1,099,737 | 6/14 | Cerieys | 266—14 |
| 1,220,444 | 3/17 | Naismith | 263—44 |
| 1,675,255 | 6/28 | Coplan | 266—44 |
| 1,678,899 | 7/28 | Baillot | 266—14 |
| 1,740,886 | 12/29 | Barr et al. | 266—25 |
| 1,747,208 | 2/30 | Anthony | 266—14 |
| 1,836,791 | 12/31 | Crawford | 266—14 |
| 2,671,658 | 3/54 | Moore | 263—44 X |

CHARLES SUKALO, *Primary Examiner.*

PERCY L. PATRICK, *Examiner.*